United States Patent [19]

Skatulla et al.

[11] Patent Number: 5,057,190
[45] Date of Patent: Oct. 15, 1991

[54] STRIPPING COLUMN INSTALLATION FOR SEPARATING MATERIALS WITH HIGH BOILING POINT DIFFERENCE

[75] Inventors: Luzian Skatulla, Mülheim/Ruhr; Hans-Jürgen Vollmer, Essen, both of Fed. Rep. of Germany

[73] Assignee: Krupp Koppers GmbH, Essen, Fed. Rep. of Germany

[21] Appl. No.: 473,877

[22] Filed: Feb. 2, 1990

[30] Foreign Application Priority Data

Feb. 16, 1989 [DE] Fed. Rep. of Germany ....... 3904711

[51] Int. Cl.$^5$ ............................................. B01D 3/14
[52] U.S. Cl. .................................. 202/153; 202/237; 165/161; 203/98; 203/DIG. 19
[58] Field of Search ............... 202/153, 235, 237, 158, 202/155; 203/99, DIG. 19, DIG. 25, 98; 165/161; 196/100, 110, 130

[56] References Cited

U.S. PATENT DOCUMENTS

| | | | |
|---|---|---|---|
| 1,806,282 | 5/1931 | Dubbs ................................ | 196/130 |
| 2,224,984 | 12/1940 | Potts et al. ......................... | 202/153 |
| 2,398,213 | 4/1946 | Dutson et al. ..................... | 196/100 |
| 3,177,129 | 4/1965 | Huckins .............................. | 202/153 |
| 3,691,022 | 9/1972 | Keunecke et al. ................. | 202/153 |
| 4,142,578 | 3/1979 | Smith .................................. | 165/161 |
| 4,323,431 | 4/1982 | Takahashi et al. ................ | 202/153 |

*Primary Examiner*—Wibur Bascomb, Jr.
*Attorney, Agent, or Firm*—Michael J. Striker

[57] ABSTRACT

A stripping column installation especially for separating starting materials with a high boiling point difference comprises a stripping column having a withdrawal plate and a column sump, and a circulating boiler connected with the stripping column and having a pipe bundle through which a sump product from the stripping column flows. The circulating boiler has an upper plate and a separating wall which separates a space above the upper plate into two chambers. One of the chambers has a connection for receiving the sump product from the stripping column, while the other of the chambers has a connection for discharging the sump product after heating in the boiler. The circulating boiler is located relative to the stripping column so that a height difference is produced between a liquid level on the withdrawal plate of the stripping column and the upper plate of the circulating boiler, the height difference having a value selected so that a total pressure of a liquid column at each point of a first portion of a pipe path in the circulating boiler lies above the vapor pressure of the sump product to be heated.

10 Claims, 2 Drawing Sheets

STRIPPING COLUMN INSTALLATION FOR SEPARATING MATERIALS WITH HIGH BOILING POINT DIFFERENCE

BACKGROUND OF THE INVENTION

The present invention relates to a stripping column installation especially for separating starting materials with a high boiling point difference. More particularly, it relates to such a stripping column installation which has a stripping column with a column sump (a lower column port for draining), and a circulating boiler connected with the column sump and provided with pipe bundles through which a sump product flows from the stripping column.

Stripping columns of the above mentioned general type are known in the art. In a stripping column in which heating of the distillative starting material to be separated into its components is performed, the sump product or a portion of it is withdrawn from the stripping column, heated or evaporated in the circulating boiler in indirect heat exchange with a heating medium and then again supplied into the stripping column. The circulating boiler is normally provided with a vertically or horizontally arranged pipe bundle. The sump product flows through the pipe bundle and the pipe bundle is heated from outside by the heat exchange medium. An example of such a column is disclosed for example in "Ullmanns Encyklopädie der technischen Chemie," 4th edition, Vol. 2, page 506, FIG. 34. Such stripping column poses certain problems for preparation of starting products with a high boiling point difference, or in other words starting products in which the boiling points of the highest boiling component and the lowest boiling component are very different from one another. In these cases, only a convective heat transfer occurs in the pipe bundle of the circulating boiler over a greater part of its pipe length. An evaporation is not possible in this region since here the vapor pressure of the low boiling components of the starting products lies below the total pressure of the liquid column. Since moreover in many cases for operational reasons only a one-time passage of the sump product withdrawn from the stripping column is performed through the circulating boiler, only moderate and in many cases very low heat transfer values are obtained in the region of the convective heat transfer. This problem can be taken care of by an increase of the heat exchange surfaces. This leads however to an increase of the total circulating boiler which is naturally expensive. In addition, in many cases such an increase contradicts operational conditions.

SUMMARY OF THE INVENTION

Accordingly, it is an object of the present invention to provide a stripping column of the above mentioned general type, which avoids the disadvantages of the prior art.

More particularly it is an object of the present invention to provide a stripping column installation including a stripping column and a circulating boiler connected with a column sump, which is especially suitable for separation of starting materials with a high boiling point difference, and in which the circulating boiler has a maximum compact construction and a high efficiency.

In keeping with these objects and with others which will become apparent hereinafter, one feature of the present invention resides, briefly stated, in a stripping column installation in which the circulating boiler has a separating wall in a space above its upper plate so that the space is separated into two chambers one of which is connected with a supply conduit from the stripping column and a first portion of a pipe bundle and the other of which is connected with a second portion of the pipe bundle and a discharge conduit for a heated sump product, and the circulating boiler is arranged relative to a column sump so that, between a level of the liquid sump product in first portion of the pipe bundle on the withdrawal plate of the stripping column and the plate of the circulating boiler a height difference is produced with a valve selected so that the total pressure of the liquid column of the liquid sump product in first portion of the pipe bundle in the circulating boiler is higher than the vapor pressure of vapor of the sump product to be heated.

When the stripping column installation is designed in accordance with the present invention, it provides for the above specified advantages.

In accordance with another feature of the present invention, a retaining weir is arranged in a space under a lower plate of the circulating boiler.

In accordance with still a further feature of the present invention a longitudinal wall is arranged under the upper plate and ends above the lower plate of the circulating boiler.

The longitudinal wall, has a plurality of horizontal guiding plate-shaped members located one above the other in the region of the pipe bundle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
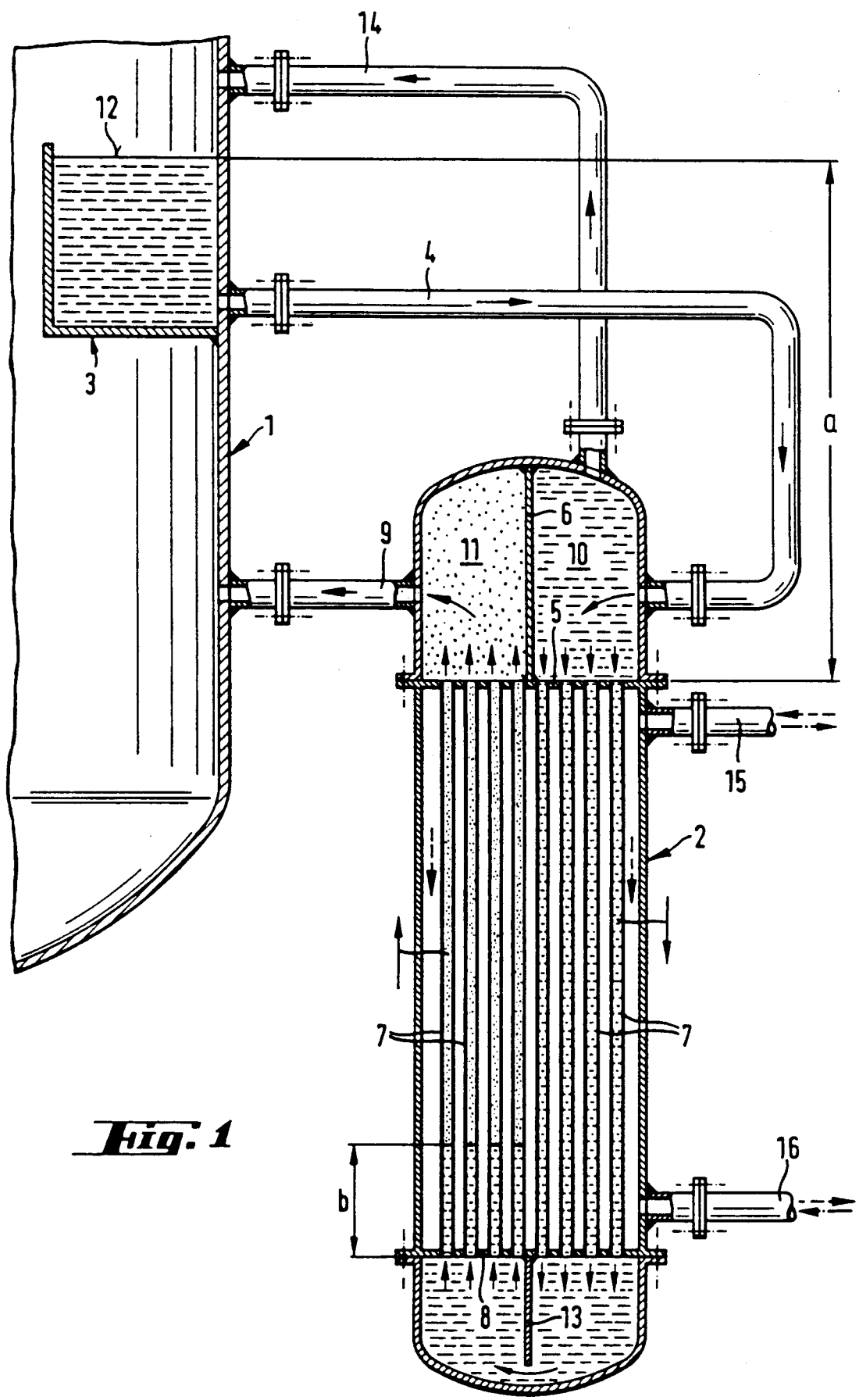
FIG. 1 is a view schematically showing a stripping column installation in accordance with the present invention, with a lower part of a stripping column and an associated circulating boiler.

FIG. 1 shows a section of a stripping column 1 with an associated circulating boiler 2. The showing is concentrated on the arrangement of the circulating boiler 2 on the stripping column 1 and its construction. Therefore, only one half of the lower part of the stripping column 1 is shown to which the circulating boiler 2 is connected. Basically this column can have a construction corresponding to the prior art. In other words, the stripping column can have conventional inserts and additional devices such as for example measuring and regulating devices. Also naturally instead of one circulating boiler 2, two or more circulating boilers of the same type can be arranged on the stripping column 1.

During the operation of the stripping column 1, a liquid sump product is withdrawn from a withdrawal plate 3 and supplied through a supply conduit 4 into the circulating boiler 2. In accordance with the present invention, the space above an upper plate 5 of the circulating boiler 2 is subdivided into two chambers 10 and 11 by a separating wall 6. The separating wall 6 is liquid-impermeable. Therefore the sump product flowing through the supply conduit 4 can discharge only through the chamber 10 into the pipes of the right half of a pipe bundle 7. In other words, due to the arrangement of the separating wall 6, the pipe path inside the pipe bundle 7 is subdivided into two portions. In the region of the first or right portion, the sump product flows from above downwardly through the pipe bundle 7 and exits through a lower plate 8.

The heat transfer between the sump product and the heating medium which flows outside around the pipe bundle 7 is performed therefore exclusively by convection. The sump product then reaches from below the left half of the pipe bundle 7 and flows through it from below upwardly, wherefrom the heated sump product discharges through the upper plate 5. In this portion of the pipe paths an evaporation occurs. The sump product is at least partially evaporated and supplied through the chamber 11 and the withdrawal conduit 9 back into the sump of the stripping column 1. The arrows in the drawing show the flow direction in both portions of the pipe paths.

For preventing an evaporation in the first right portion of the pipe path, it is provided in accordance with the present invention that the circulating boiler 2 is arranged on the stripping column 1 so that a height difference is produced between the liquid level 12 on the withdrawal plate 3 of the stripping column and the upper plate 5 of the circulating boiler. The value of the height difference is selected so that the total pressure of the liquid column in the first portion of the pipe path is greater than the vapor pressure of the sump product to be heated. It is to be understood that the height difference a is dependent on the vapor pressure of the sump product to be heated. The height difference a increases with the increase of the vapor pressure under the given temperature conditions in the circulating boiler 2. In practice, in most application cases the height difference a must be maintained at least equal to 1 m.

For reliably preventing an evaporation in the first portion of the pipe path, it is also provided in accordance with the present invention that the height b of the liquid column in it does not exceed a certain minimal value, and the evaporation part first starts above such liquid column. The value for b must lie not below 1 m. For adjusting the desired relations, a retaining weir 13 or another device for retaining the liquid can be arranged for example in the space below the lower plate.

A conduit 14 serves for aerating the space above the upper plate 5. Connecting pipes 15 and 16 are provided for supplying and withdrawing a heating medium. The flow direction of the heating medium can be selected arbitrarily in correspondence with the respective conditions. In other words, the heating medium can enter both through the pipe 15 in the circulating boiler 2 and exit through the pipe 16, and also enter through the pipe 16 and exit through the pipe 15.

Figure 2:
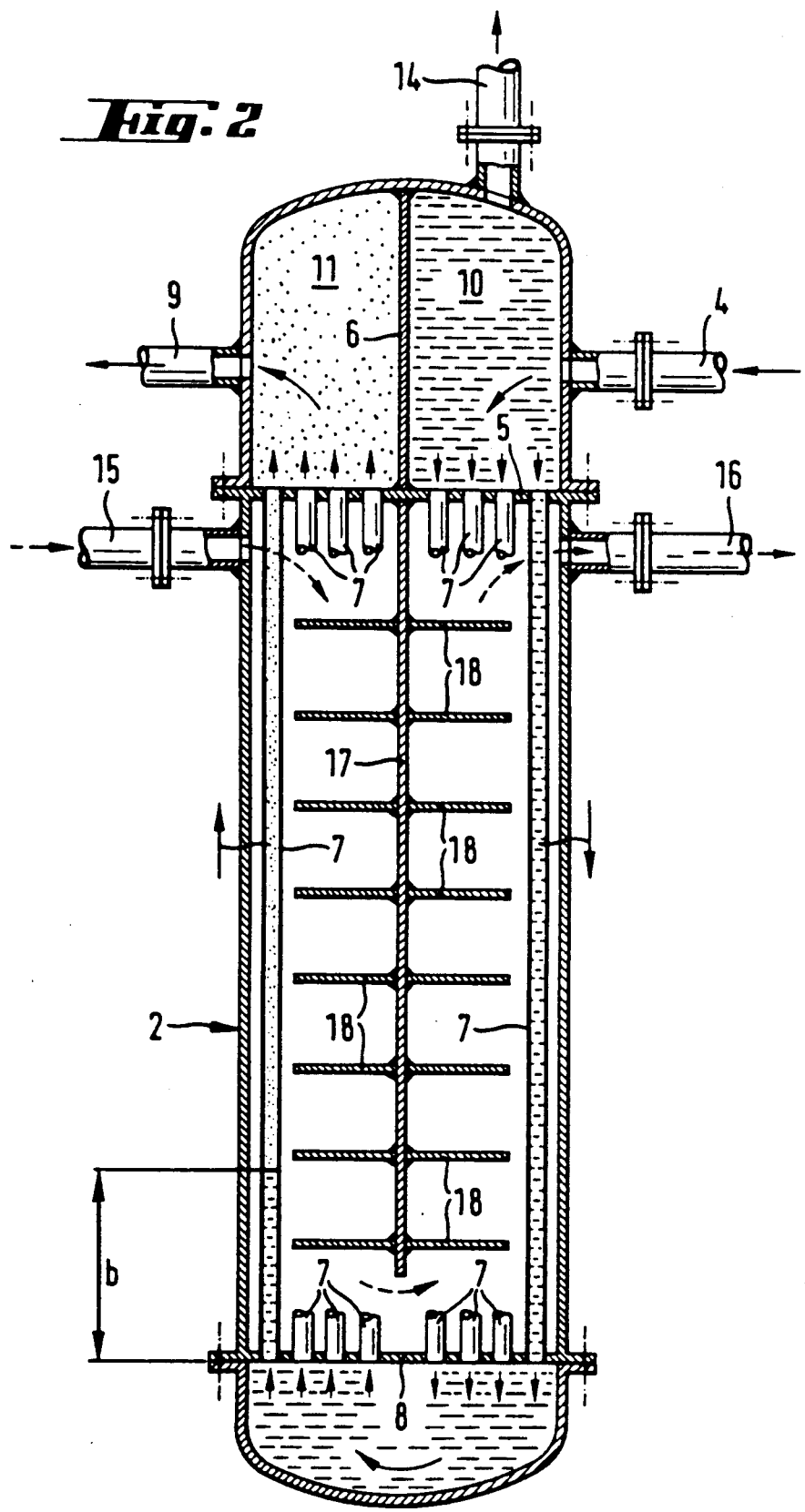
FIG. 2 is a view showing a section of the stripping column installation in accordance with another embodiment of the present invention.

FIG. 2 shows another embodiment, in accordance with which not only the space above the upper plate 5 of the circulating boiler 2 is subdivided by the separating wall 6, but also a longitudinal wall 17 is arranged underneath the upper plate bottom 5. The arrangement of the circulating boiler 2 on the stripping column 1 corresponds to that shown in FIG. 1, and therefore the stripping column 1 is no longer illustrated in FIG. 2.

The same reference numerals are used for the parts corresponding to the parts of FIG. 1.

The longitudinal wall 17 starts immediately under the upper plate 5 and ends above the lower plate 8. Therefore, a sufficient intermediate space remains between the lower plate 8 and the lower end of the longitudinal wall 17. Moreover, in this embodiment the longitudinal wall 17 in the region, of the pipe bundle 7 is provided with several horizontal guiding plate-shaped members 18 located one above the other. The guiding plate-shaped members do not extend over the whole diameter of the pipe bundle 7.

In contrast to the embodiment of FIG. 1, the connecting pipes 15 and 16 for the heating medium are arranged not one under the other but opposite to one another. Thereby the flow path of the heating medium inside the circulating boiler 2 is extended, which naturally leads to an improvement of the heat exchange. The heating medium can enter the circulating boiler 2 for example through the connecting pipe 15 and then flow into the left, half from above downwardly to flow around the horizontal guiding plate-shaped member 18. In the intermediate space between, the lower end of the longitudinal wall 17 and the lower plate 8 the flow is deviated as shown by the arrow. Then the heating medium flows into the right half of the circulating bottom from below upwardly and is withdrawn through the connecting pipe 16. It is to be understood that the flow path of the heating medium can also be selected in an opposite direction. In other words, the heating medium can enter through the connecting pipe 16 and exit through the connecting pipe 15. The flow path of the sump product to be heated remains the same in every case, as described hereinabove in connection with the embodiment of FIG. 1. For simplifying the showing and thereby the arrangement of the longitudinal wall, as well as the associated guiding plates 18, only outer pipes of the pipe bundle 7 are shown in FIG. 2. It is to be understood that in practice the pipe bundle 7 in FIG. 2 is provided with the same pipes a shown in FIG. 1.

The use of the inventive stripping column in practice is especially applicable when the following conditions take place:

at least one third of the heat exchange surface available in the circulating boiler is required for the convective heat exchange until reaching the saturation point of the sump product to be heated or evaporated This is especially the case for starting materials with high boiling point difference A practical example for it is the preparation of the extract of preceding extraction processes for recovery of pure hydrocarbons from corresponding starting materials. In this case, the hydrocarbons to be recovered in the stripping column, for example aromates, must be driven from the high boiling solvent.

Operational conditions make necessary a limitation of the length of the circulating boiler. Before the invention it was proposed in such cases to maintain the required heat exchange surface by increasing the boiler diameter and the number of the heat exchange pipes. This led however to worse heat exchange parameters.

From operational reasons, only one passage of the sump product to be heated is provided through the circular boiler.

When the stripping column in accordance with the present invention is utilized, the same output is achieved with a heat exchange surface reduced by 30% relative to the known constructions.

It will be understood that each of the elements described above, or two or more together, may also find a useful application in other types of constructions differing from the types described above.

While the invention has been illustrated and described as embodied in a stripping column, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A stripping column installation for separating starting materials with a high boiling point difference, comprising a stripping column having a withdrawal plate and a column sump; and a circulating boiler connected with said stripping column and having a pipe bundle through which a liquid sump product from said withdrawal plate of said stripping column flows, said circulating boiler having an upper plate and a separating wall which separates a space above said plate into two chambers, one of said chambers having a connection for receiving the liquid sump product from said withdrawal plate of said stripping column and is connected with a first portion of said pipe bundle, while the other of said chambers is connected with a second portion of said pipe bundle and has a connection for discharging the sump product for return to said stripping column after heating in said boiler, said circulating boiler being located relative to said stripping column so that a height difference is produced between a level of the liquid sump product on said withdrawal plate of said stripping column and said upper plate of said circulating boiler, said height difference having a value selected so that a total pressure of a liquid column of the liquid sump product in said first portion of said pipe bundle in said circulating boiler is higher than a vapor pressure of vapor of the sump product to be heated.

2. A stripping column installation as defined in claim 1; and further comprising a supply conduit connecting said stripping column at said withdrawal plate to said connection of said one chamber.

3. A stripping column installation as defined in claim 1; and further comprising a withdrawal conduit connected with said connection of said other chamber for withdrawing the heated sump product.

4. A stripping column installation as defined in claim 1, wherein said circulating boiler has a lower plate and a retaining weir arranged in a space located under said lower plate.

5. A stripping column installation as defined in claim 1, wherein said circulating boiler has a longitudinal wall extending underneath said upper plate.

6. A stripping column installation as defined in claim 5, wherein said circulating boiler has a lower-pipe plate, said longitudinal wall ending shortly above said lower plate.

7. A stripping column installation as defined in claim 5, wherein said longitudinal wall is provided with a plurality of guiding plate-shaped members located in the region of said pipe bundle.

8. A stripping column installation as defined in claim 7, wherein said guiding plate-shaped members extend in a substantially horizontal direction.

9. A stripping column installation for separating starting materials with a high boiling point difference, comprising a stripping column having a withdrawal plate and a column sump; and a circulating boiler connected with said stripping column and having a pipe bundle through which a liquid sump product from said withdrawal plate of said stripping column flows, said circulating boiler having an upper plate and a separating wall which separates a space above said upper plate into two chambers, one of said chambers having a connection for receiving the liquid sump product from said withdrawal plate of said stripping column, while the other of said chambers has a connection for discharging the sump product for return to said stripping column after heating in said boiler, said circulating boiler being located relative to said stripping column so that a height difference between a level of the liquid sump product on said withdrawal plate of said stripping column and said upper plate of said circulating boiler is equal to at least 1 meter.

10. A stripping column installation for separating starting materials with a high boiling point difference, comprising a stripping column having a withdrawal plate and a column sump; and a circulating boiler connected with said stripping column and having a pipe bundle through which a liquid sump product from said withdrawal plate of said stripping column flows, said circulating boiler having an upper plate and a separating wall which separates a space above said upper plate into two chambers, one of said chambers having a connection for receiving the liquid sump product from said withdrawal plate of said stripping column, and is connected with a first portion of said pipe bundle, while the other of said chambers is connected with a second portion of said pipe bundle and has a connection for discharging the sump product for return to said stripping column after heating in said boiler, said circulating boiler being located relative to said stripping column so that a height difference between a level of the liquid sump product on said withdrawal plate of said stripping column and said upper plate of said circulating boiler is equal to at least 1 meter.

* * * * *